United States Patent
Fichtner

(10) Patent No.: US 11,835,140 B2
(45) Date of Patent: *Dec. 5, 2023

(54) METHOD OF FORMING SEALING ELEMENTS FOR USE IN A MECHANICAL SEAL

(71) Applicant: A.W. CHESTERTON COMPANY, Groveland, MA (US)

(72) Inventor: Josef Fichtner, Wolfratshausen (DE)

(73) Assignee: A.W. CHESTERTON COMPANY, Groveland, MA (US)

( * ) Notice: Subject to any disclaimer, the term of this patent is extended or adjusted under 35 U.S.C. 154(b) by 641 days.

This patent is subject to a terminal disclaimer.

(21) Appl. No.: 16/844,371

(22) Filed: Apr. 9, 2020

(65) Prior Publication Data

US 2020/0325992 A1   Oct. 15, 2020

Related U.S. Application Data

(60) Provisional application No. 62/832,206, filed on Apr. 10, 2019.

(51) Int. Cl.
*F16J 15/3284* (2016.01)
*F16J 15/34* (2006.01)

(52) U.S. Cl.
CPC .................. *F16J 15/3464* (2013.01)

(58) Field of Classification Search
CPC ....... F16J 15/34; F16J 15/3464; F16J 15/3496
See application file for complete search history.

(56) References Cited

U.S. PATENT DOCUMENTS

| | | | |
|---|---|---|---|
| 2,802,513 A | 8/1957 | Stoeckel | |
| 3,697,348 A | 10/1972 | Farnam | |
| 3,857,156 A | 12/1974 | Clark | |
| 5,918,514 A | 7/1999 | Crudgington et al. | |
| 2002/0089123 A1* | 7/2002 | Azibert | F16J 15/348 277/370 |
| 2007/0224036 A1 | 9/2007 | Yandle | |
| 2018/0372160 A1 | 12/2018 | Mehmedovic et al. | |

FOREIGN PATENT DOCUMENTS

| | | |
|---|---|---|
| CN | 202883454 U | 4/2013 |
| CN | 106321503 A | 1/2017 |
| EP | 0528029 A1 * | 2/1993 |
| WO | WO-2019034519 A1 * | 2/2019 ........... F16J 15/3268 |

OTHER PUBLICATIONS

International Search Report and Written Opinion, PCT/US20/27430, dated Sep. 4, 2020, 12 pages.

* cited by examiner

*Primary Examiner* — Gilbert Y Lee
(74) *Attorney, Agent, or Firm* — Nelson Mullins Riley & Scarborough LLP; Anthony A. Laurentano

(57) ABSTRACT

A system and method for forming sealing elements for a mechanical seal that are shaped so as to fill substantially completely the groove that seats the sealing elements. The mechanical seal includes a holder assembly, sleeve assembly, balance piston or any other rotary or stationary part having one or more grooves formed therein and a sealing element that seats within the groove.

14 Claims, 5 Drawing Sheets

METHOD OF FORMING SEALING ELEMENTS FOR USE IN A MECHANICAL SEAL

RELATED APPLICATION

The present application claims priority to U.S. provisional patent application Ser. No. 62/832,206, filed on Apr. 10, 2019, and entitled METHOD OF FORMING ELASTOMER RINGS FOR A MECHANICAL SEAL, the contents of which are herein incorporated by reference.

BACKGROUND OF THE INVENTION

In conventional mechanical seals, the holder portion of the mechanical seal is typically secured, such as by clamping, between an impeller and a shaft of commercial equipment, such as for example a pump, so as to reduce the number of crevices in the seal. This helps reduce unwanted leakage of process fluid from the pump. However, this securing technique requires field personnel to modify the design of the mechanical seal by introducing the securing mechanism. This can compromise the overall sealing integrity of the mechanical seal.

According to other known techniques, the mechanical seal employs additional sealing elements, such as annular O-rings, to help seal process fluid within the mechanical seal. A drawback of these conventional annular sealing elements is that they do not completely seal fluid or do not fully fill the space or groove that seats the sealing element. In certain commercial environments, such as those where it is essential that no micro bacterial growth occurs, this is unacceptable. To address this shortcoming, specially designed sealing elements were formed using conventional molding techniques. For example, the sealing elements are manufactured by shaping liquid raw material using a rigid frame called a mold. However, these conventional molding techniques are expensive and time consuming to manufacture the appropriate sealing element.

SUMMARY OF THE INVENTION

The present invention is directed to a system and method for forming sealing elements for a mechanical seal that are shaped so as to fill substantially completely the groove that seats the sealing elements. The mechanical seal includes a holder assembly having one or more grooves formed therein and a sealing element that seats within the groove.

The present invention is also directed to a mechanical seal that employs a sealing cover element that is configured for overlying or covering a fastener-receiving aperture formed in a holder assembly, thus forming a fluid tight seal. The sealing cover element has leg portions that seat within grooves that are disposed on both sides of the fastener-receiving aperture so as to secure the sealing cover element to the holder assembly.

The present invention is directed to a method of forming a sealing element for a mechanical seal, comprising winding a source of elastomer material, heating the elastomer material to form a homogenous elastomer material, coating the homogenous elastomer material with a resin material, placing the resin coated elastomer material into a turning machine, forming the outer profile and shape of the sealing element into the shaped resin coated elastomer material, and cutting the sealing elements from the shaped resin coated elastomer material.

The elastomer material can include any of ethylene propylene (EP), ethylene propylene diene methylene (EPDM), fluoroelastomers including FKM and FPM as defined by the ASTM International standard D1418, perfluoroelastomers including FFKM, and tetrafluoroethylene-propylene rubber including FEPM. Further, the elastomer material has a hardness between about 70 Shore A and about 90 Shore A.

The present invention is also directed to a system for forming a sealing element for a mechanical seal, comprising a source of elastomer material, a winding machine for winding the elastomer material, a heating unit having one or more heating elements for heating the elastomer material to form a homogenous elastomer material, a coating unit for coating the homogenous elastomer material with a resin material, a turning machine for forming the outer profile and shape of the sealing element into the shaped resin coated elastomer material, and a cutting unit for cutting the sealing element from the shaped resin coated elastomer material. The system can also include an electronic device for communicating with and controlling one or more of the winding machine, the heating unit, the coating unit, the turning machine, and the cutting unit. The electronic device comprises a processor and a memory element The turning machine can include one or more cutting elements for forming the profile in the shaped resin coated elastomer material.

According to another aspect, the present invention is directed to a mechanical seal for mounting about a shaft, comprising a holder assembly having a main body having an inner surface and an opposed outer surface, and a first groove formed in the inner surface of the holder assembly and a second groove formed in the outer groove of the holder assembly, a rotary seal ring coupled to the holder assembly, a stationary seal ring disposed adjacent to the rotary seal ring, a first sealing element for seating within the first groove and configured so as to fill substantially completely the first groove, and a second sealing element for seating within the second groove and configured so as to fill substantially completely the second groove.

The first sealing element has a shape that is complementary to the shape of the first groove and the second sealing element has a shape that is complementary to the shape of the second groove. Further, the main body of the holder assembly has one or more fastener-receiving apertures formed therein and extending between the inner surface and the outer surface and being sized and configured for seating a fastener.

With regard to the holder assembly, the assembly also includes first and second cover grooves formed in the outer surface of holder assembly, wherein the first cover groove is formed on one side of the fastener-receiving aperture and the second cover groove is formed on the other side of the fastener-receiving aperture, and a sealing cover element having a main body having a first leg portion, an opposed second leg portion, and an intermediate portion disposed between and coupled to the first and second leg portions. The first leg portion of the sealing cover element is sized and configured for seating within the first groove, the second leg portion of the sealing cover element is sized and configured for seating within the second groove, and the intermediate portion of the sealing cover element covers the fastener-receiving aperture. The first leg portion is sized and configured so as to fill substantially completely the first cover groove, and the second leg portion is sized and configured so as to fill substantially completely the second cover groove, and the intermediate portion of the sealing cover element has a top surface and an opposed bottom surface, and the first and second leg portions each have a top surface and an opposed bottom surface. The top surface of the intermediate portion is radially spaced from the top surface of the first and second leg portions. Further, the bottom surface of the first and second leg portions is radially spaced from the bottom surface of the intermediate portion.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Figure 1:
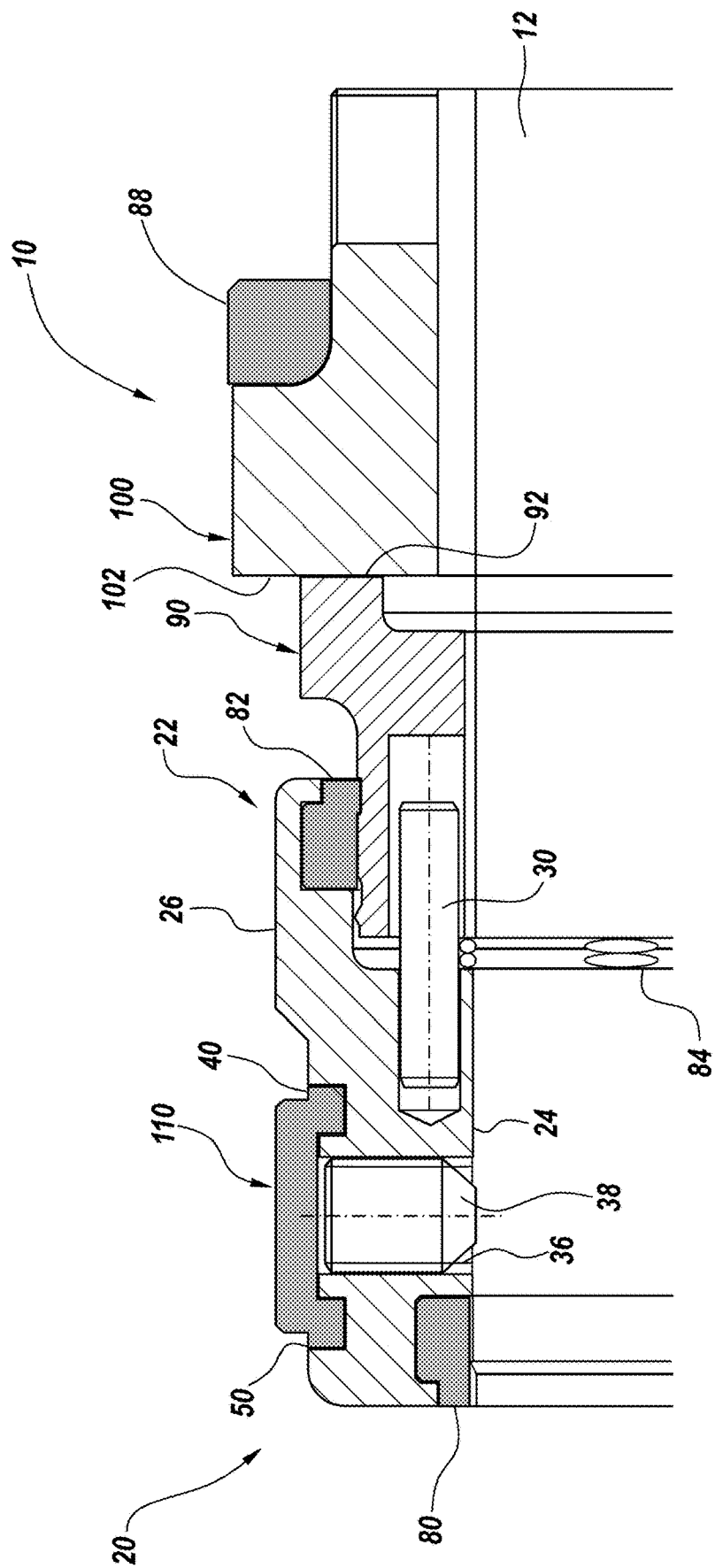
FIG. 1 is a partial cross-sectional view of a mechanical seal employing a sealing cover element to seal a set screw aperture according to the teachings of the present invention.

The present invention provides a sealing cover element for providing sealing of a set screw aperture formed in a holder assembly of a mechanical seal as well as additional sealing elements for providing a fluid tight seal at selected seal locations. The present invention will be described below relative to illustrated embodiments. Those skilled in the art will appreciate that the present invention may be implemented in a number of different applications and embodiments and is not specifically limited in its application to the particular embodiment depicted herein.

The term "shaft" as used herein is intended to refer to any suitable device in a mechanical system to which a seal can be mounted and includes shafts, rods and other known devices.

The terms "axial" and "axially" as used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to that portion of the stationary equipment and/or components of a mechanical seal that are disposed proximate to the stationary equipment (e.g., mechanical system) employing the mechanical seal. As such, this term also refers to the components of the mechanical seal that are mounted to or within the stationary equipment or are disposed the deepest within or closest to the equipment (e.g., inboard). Conversely, the term "axially outer" as used herein refers to the portion of stationary equipment and the mechanical seal that is disposed distal from (e.g., outboard) of the mechanical seal.

The term "radially inner" as used herein refers to the portion of the mechanical seal or associated components that are proximate to a shaft. Conversely, the term "radially outer" as used herein refers to the portion of the mechanical seal or associated components that are distal from the shaft.

The terms "stationary equipment" and/or "static surface" as used herein are intended to include any suitable stationary structure housing a shaft or rod to which a seal having a gland is secured. Those of ordinary skill will also recognize that the gland assembly can form part of the mechanical seal or part of the stationary equipment.

The terms "process medium" and/or "process fluid" as used herein generally refer to the medium or fluid being transferred through the stationary equipment. In pump applications, for example, the process medium is the fluid being pumped through the pump housing.

The term "gland" as used herein is intended to include any suitable structure that enables, facilitates or assists securing the mechanical seal to the stationary equipment, while concomitantly surrounding or housing, at least partially, one or more seal components. If desired, the gland can also provide fluid access to the mechanical seal.

The term "mechanical seal" as used herein is intended to include various types of mechanical seals, including single seals, split seals, tandem seals, dual seals, concentric seals, gas seals, spiral seals, solid seals, split seals and other known seal types and configurations.

Figure 2:
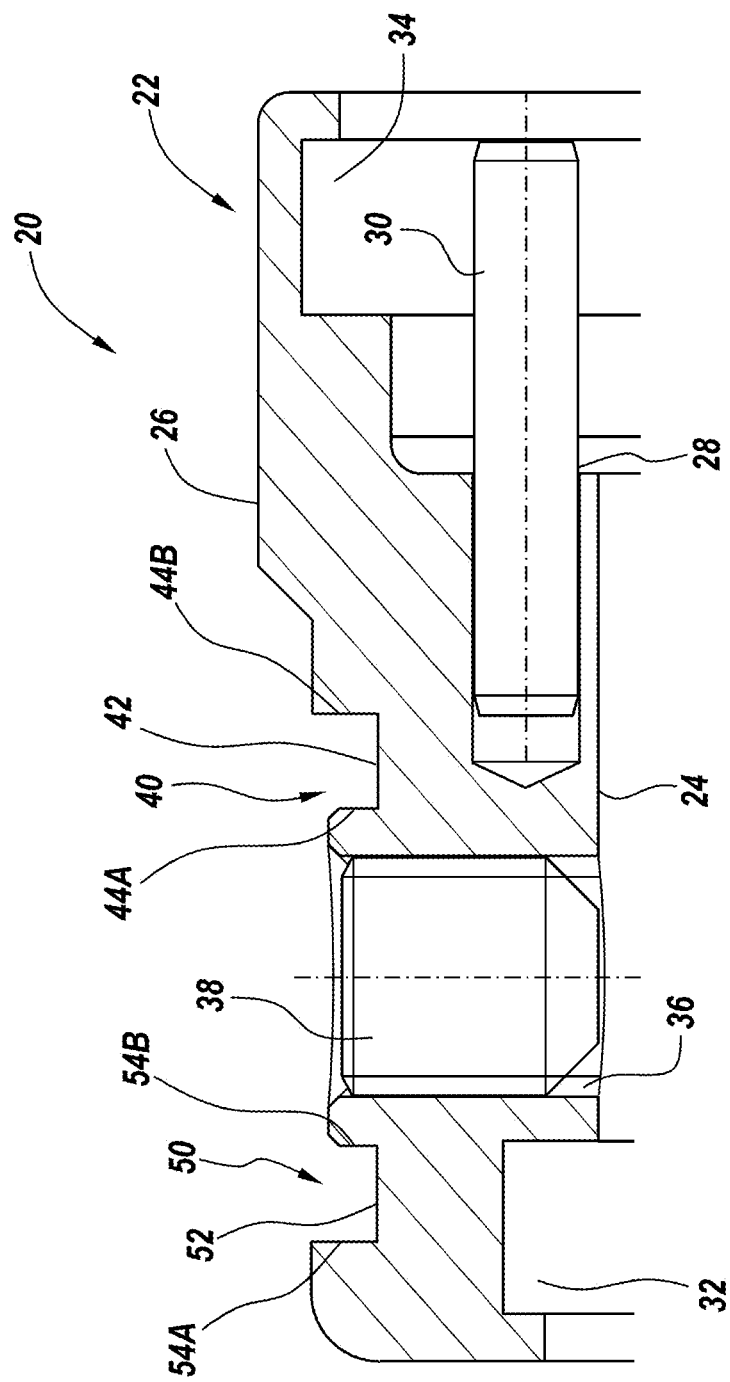
FIG. 2 is a partial cross-sectional view of the holder element of the mechanical seal according to the teachings of the present invention.
Figure 3:
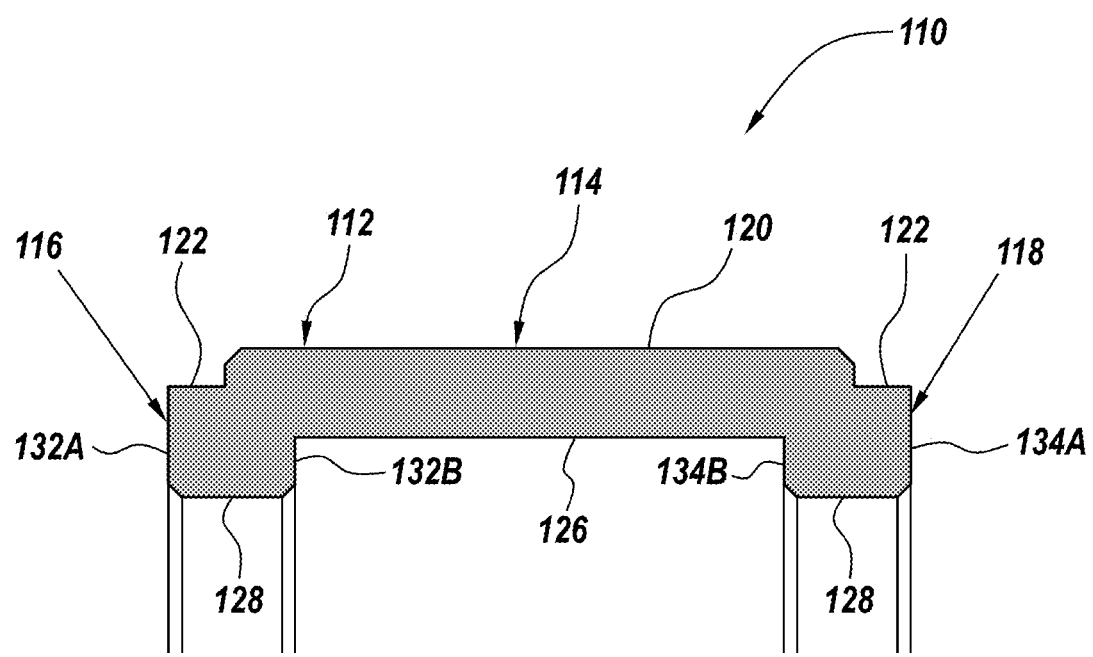
FIG. 3 is a partial cross-sectional view of the sealing elements of FIG. 1 according to the teachings of the present invention.

As shown in FIGS. 1-3, the mechanical seal 10 of the present invention comprises an annular holder assembly 20, an annular rotary seal ring 90, an annular stationary seal ring 100, and additional annular sealing elements, all of which are disposed about a shaft 12. The holder assembly 20 is typically disposed within an annular gland (not shown), which is secured to stationary equipment, as is known in the art. The rotary seal ring 90 has a sealing surface 92 that is configured to be disposed in sealing contact with a sealing surface 102 of the stationary seal ring 100. The mechanical seal 10 also includes one or more biasing elements, such as springs 84, that are mounted between a back side or rear portion of the rotary seal ring 90 and an inner radial stepped surface of the holder assembly 20 for providing a biasing force to the rear portion of the rotary seal ring 90.

The illustrated holder assembly 20 includes a main body 22 having an inner surface 24 and an outer surface 26. The inner surface 24 has an inner fastener or set screw aperture 28 formed therein for seating a fastener, such as a pin or a set screw 30. The pin or set screw 30 helps couple the rotary seal ring 90 to the holder assembly 20. The inner surface 24 also has formed therein an innermost sealing groove 32 that is sized and configured for seating a sealing element 80. The sealing element 80 provides a fluid-tight seal between the axially innermost portion of the holder assembly 20 and the shaft 12. The inner surface 24 also includes an axially outermost sealing groove 34 for seating a sealing element 82. The sealing element 82 provides a seal between the holder assembly 20 and a radially outer surface of the rotary seal ring 90. An additional sealing element 88 can be employed to provide sealing about an upper portion of the stationary seal ring 100.

The main body 22 of the holder assembly 20 also includes a fastener-receiving aperture 36 that is formed between the outer surface 26 and the inner surface 24 thereof. Specifically, the fastener-receiving aperture 38 fully extends between the inner and outer surfaces of the holder assembly 20. The fastener-receiving aperture 36 is sized and configured for seating a fastener, such as a set screw 38. The outer surface 26 of the main body 22 further comprises a pair of sealing element grooves 40, 50 that are disposed on either side of the fastener-receiving aperture 36 and hence are axially spaced apart along the outer surface 26. The grooves 40, 50 are preferably disposed relatively adjacent to the fastener-receiving aperture 36. The grooves are sized and configured for seating a portion of an annular sealing cover element 110. According to one embodiment, the holder assembly 20 can have a plurality of fastener-receiving apertures 36 formed therein. The set screws 38 help position and mount the mechanical seal 10 at one or more selected positions, and help mechanically couple the holder assembly 20 to the shaft 12. The sealing cover element 110 helps minimize or prevent process fluid from leaking past the set screw 38 through the aperture 36.

As shown in FIGS. 1-2, the groove 40 includes a groove bottom or floor 42 and a pair of opposed groove sidewalls 44A, 44B. Similarly, the groove 50 includes a groove floor 52 and a pair of opposed sidewalls 54A, 54B. The sidewalls of the grooves 40, 50 can be configured so as to be generally straight (i.e., generally vertical or radially extending) or can be angled relative to an elongated axis of the holder assembly 20. The grooves 40, 50 can be identical in size and shape or can be differently configured.

As shown in FIG. 3, the sealing cover element 110 has a main body 112 that has a pair of opposed leg portions 116, 118 that are coupled together by an intermediate portion 114. The leg portions 116, 118 are formed at opposed ends of the sealing cover element 110. The intermediate portion 114 has a top surface 120 that is spaced both axially and radially (e.g., horizontally and vertically) from a top surface 122 of the leg portions 116, 118. Similarly, a bottom surface 126 of the intermediate portion 114 is spaced both axially and radially (e.g., both horizontally and radially) from the bottom surfaces 128 of the leg portions 116, 118. Each of the leg portions 116, 188 also includes sidewalls. For example, the leg portion 116 includes opposed sidewalls 132A, 132B and the leg portion 118 includes opposed sidewalls 134A, 134B. The opposed sidewalls meet the bottom surface 128 to form corner or edge portions that can be relatively straight (e.g., at 90 degree angles) or can be rounded or curved. The leg portions 118, 118 can have dimensions that are slightly larger than the dimensions of the groves 40, 50 such that the leg portions when seated within the grooves form a frictional or mechanical fit. Moreover, the intermediate portion 114 has a length that corresponds to the axial distance between the grooves 40, 50. The sealing cover element 110 can be made of any suitable resilient material, and can be formed from an elastomer material.

In operation, the mechanical seal 10 of the present invention can be assembled and then mounted to the stationary equipment (not shown). When assembled, the rotary seal ring 90 is coupled to the holder assembly 20 by the pin or set screw 30. The holder assembly 20 is then axially positioned along the shaft 12 of the stationary equipment and tightened relative thereto using the set screws 38. To avoid any leakage passing the set screws 38, the sealing cover element 110 is placed over the set screws 38 and corresponding fastener-receiving apertures 36, thus forming a fluid-tight seal. In order to prevent the sealing cover element 110 from being accidentally removed or spun off of the mechanical seal 10 when the shaft rotates at higher speeds, the sealing cover element 110 can be stretched over the set screws 38. Specifically, the leg portion 116 seats within the groove 50 and the leg portion 118 seats within the groove 40. When the leg portions 116, 118 are seated or pressed within the grooves 40, 50, the intermediate portion 114 of the sealing cover element 110 spans or extends between the grooves 40, 50 and covers the fastener-receiving apertures 36 and the set screws 38 mounted therein. That is, the bottom surface 128 of the leg portion 116 contacts the floor 52 of the groove 50, and the sidewalls 132A, 132B of the leg portion 116 contact the sidewalls 54A, 54B, respectively, of the groove 50. Likewise, the bottom surface 128 of the leg portion 118 contacts the floor 42 of the groove 40, and the sidewalls 134A, 134B of the leg portion 118 contact the sidewalls 44A, 44B, respectively, of the groove 40. The mounting or seating arrangement of the sealing cover element 110 helps prevent fluid from passing or leaking past the thread holes of the set screw aperture 36 and associated set screws 38. The leg portions 116, 188 of the sealing cover element 110 are axially squeezed when mounted within the grooves 40, 50 so as to avoid any potential leakage from the set screws, thus attaining a substantially fluid-tight and crevice-free design.

Further, the holder assembly 20 can be configured such that the sealing cover element 110 can be mounted on the inner surface 24 of the main body 22 thereof rather than on the outer surface 26, as shown. In this embodiment, the grooves 40, 50 are formed on the inner surface 24 on either side of the fastener-receiving aperture 36. The grooves 40, 50 can be configured such that the leg portions 116, 188 of the sealing cover element 110 are axially squeezed into the grooves. The sidewalls of the grooves 40, 50 are configured so as to be generally straight (i.e., generally vertical or radially extending) or can be angled relative to an elongated axis of the holder.

Based on the design and configuration of the sealing cover element 110, the sealing cover element is able to meet the space constraint requirements of the mechanical seal 10 and associated stationary equipment. Moreover, the sealing cover element 110 in combination with other sealing elements serve to create a crevice-free environment, which is essential for applications where micro bacterial grow is not permitted.

The present invention is also directed to a system and method of forming or creating the sealing elements to form a substantially crevice free design. That is, the sealing elements can be formed so as to fill substantially completely the groove or channel that seats the sealing elements. According to one practice, the term "substantially completely" is intended to mean filling the groove or channel with the sealing element such that greater than 95% of the groove or channel is filled solely by the sealing element, and preferably greater than 97%. One of ordinary skill in the art will be readily able to determine based on the teachings herein and based on the application or environment of the mechanical seal the percentage of the groove or channel that needs to be filled with the sealing element so as to reduce to the extent possible the unfilled portions of the groove. Further, the sealing elements can have any selected shape and size, and are preferably not circular or oval in shape.

In order to employ sealing elements, such as the sealing elements 80 and 88, and if desired the sealing cover element 110, that accommodate and seat fully within their respective channels or grooves to form a crevice-free design, they typically need to be specially formed and configured. The specially configured sealing elements are preferably configured or shaped (e.g., complementary in shape) to the selected shape and contours of the corresponding groove. According to the present invention, the annular sealing elements 80 and 88, as well as if desired any of the other sealing elements of the mechanical seal 10, can be formed from an elastomer material. The annular sealing elements are preferably machined from an elastomer source material that includes for example elastomer tubes. The formation process of the present invention allows for much higher flexibility, responsiveness and reduction of tooling costs.

The mechanical seal 10 of the present invention employs specially designed and configured sealing elements, such as sealing elements 80 and 88, having varying contours and shapes designed to significantly reduce or eliminate any potential spaces or crevices in the channels or grooves that seat the sealing elements. The specially formed and shaped sealing elements are installed where conventional O-rings or sealing elements are traditionally used. When employing conventional sealing elements, there are typically spaces or gaps of unwanted sizes within the channel that can make the conventional sealing elements unsuitable for their intended purpose. The sealing elements of the present invention are machined from a source sealing material, such as elastomer tubes, to ensure maximum manufacturing flexibility. The sealing elements of the present invention are configured to substantially the same shape and size of the channel or grooves and are designed to be radially and/or axially squeezed within the respective grooves depending on the shape and contours of the particular sealing element, imbedded groove shape and/or equipment design. The sealing elements hence serve to minimize, reduce or eliminate any potential crevices such that no micro-bacterial growth may occur. This crevice-free design also allows easier and thorough cleaning of the mechanical seal 10.

The sealing element 80 of the present invention is sized and configured for seating substantially completely within the corresponding groove or channel 32, and the sealing element 82 is sized and configured for seating substantially completely within the groove 34. The sealing elements 80, 82 and 88 can be made from a relatively soft or resilient elastomer material. Specifically, the typical hardness of the elastomer material varies from between about 70 Shore A and about 90 Shore A. Typical elastomer materials suitable for use herein can include for example synthetic elastomers including ethylene propylene (EP) and ethylene propylene diene methylene (EPDM), which is a type of synthetic rubber; fluoroelastomers including FKM and FPM as defined by the ASTM International standard D1418; perfluoroelastomers including FFKM; and tetrafluoroethylene-propylene rubber including FEPM.

Figure 4:
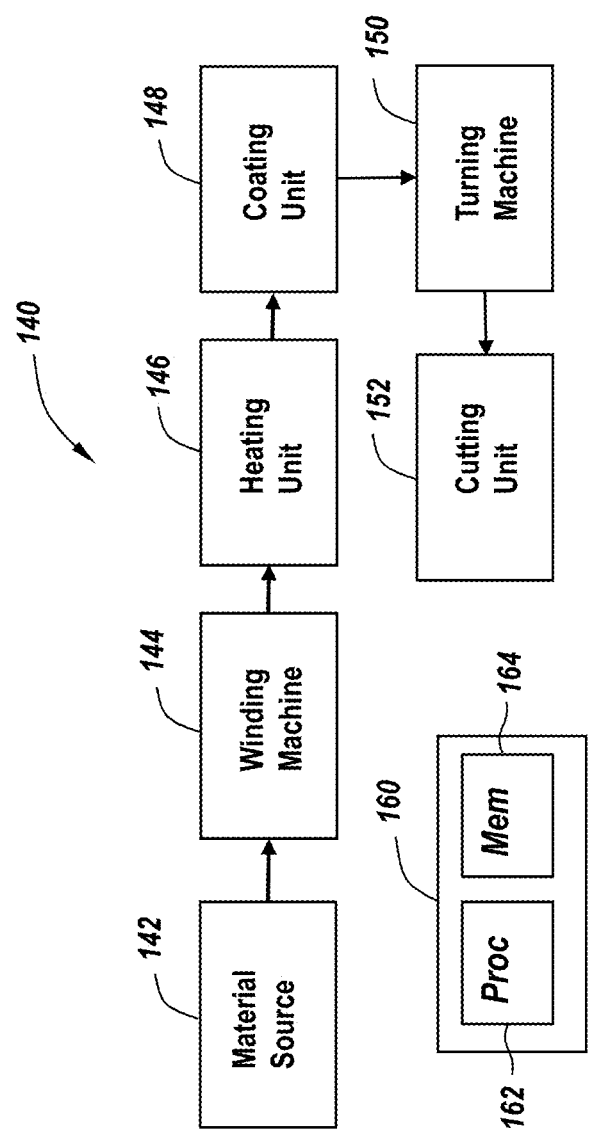
FIG. 4 is a schematic block diagram of a sealing element formation system for forming and shaping sealing elements for a mechanical seal according to the teachings of the present invention.

As shown in FIG. 4, the present invention includes a sealing element formation system 140 for forming or creating an annular sealing element for use with the mechanical seal 10. The formation system 140 includes a material source 142 that includes a source of the elastomer material. The elastomer material is then conveyed or transferred to a winding machine 144 so that the source material can be wound into any suitable shape, and can include a generally elongated tubular shape having a round, oval, square or rectangular cross-section. The tubes preferably have a rectangular cross-section before machining. The winding machine 144 can be any conventional winding machine as is known in the art. The tube of source material is then exposed to heat from a heating unit 146 for heating the source material tube to a selected temperature for a selected period of time. The heating unit 146 can be any known type of heating unit that employs one or more heating elements. For example, the heating unit 146 can be a resistive heating unit or any other known and suitable type of heating unit. The source material tube is heated by the heating unit to a selected temperature or temperature range so as to form a generally and substantially homogeneous product. The temperature or temperature range as well as the duration of heating can vary based on the type of source material employed by the system 140 and the type of mechanical seal 10. The heated source material tube can then be coated with a suitable coating material by the coating unit 148. The coating material can be any suitable material, such as a resin material, such that when the heated source material is coated, the coated material is sufficiently stiff for subsequent machining on any conventional chipping machine.

The coated material thus has an outer resin layer that can then be secured, such as by clamping, into a conventional turning or lathing machine 150. The turning machines are standard machines in the relevant industries and need not be described further herein. The turning machine can include a relatively sharp, hard metal turning or cutting tool (not shown) that can be used to machine or cut any type of contour into the generally rectangular elastomer tube. The turning is preferably done by cutting or chipping material away from the tube until the dimensions and contours of the tube match the requirements of the sealing elements necessary for the specific channel design. The turning machine 150, and any of the other relevant portions of the formation system 140, can be coupled to an electronic device 160 that can be used to control the operation of any selected portion of the formation system 140. For example, the electronic device can be used to control one or more of the winding machine 144, the heating unit 146, the coating unit 148 and/or the turning machine 150. The electronic device 160 can be a computer, a server, a tablet, a smart phone or the like. As is known in the art, the electronic device 160, in addition to other elements such as a display, user interface, and input elements (e.g., keyboard, mouse, and the like), can include a processor 162 and a storage or memory element 164. The memory element 164 can store any selected application and software suitable for communicating with and/or operating one or more of the components of the system 140. For example, the turning machine 150 can communicate with the electronic device 160 which can have stored thereon software instructions for operating the turning machine so as to cut or turn the material into any predetermined and pre-stored shape.

The illustrated formation system 140 also includes a cutting unit 152 that can include one or more cutting elements suitable for cutting the material. The cutting unit 152 can be employed to cut the turned material into the individual annular or ring-like sealing elements. The cutting of the turned material by the cutting unit 152 can be done by a chip less process that employs a relatively sharp cutting tool. The cutting unit employing the cutting tool can form part of the turning machine 150 or can be a separate component that forms part of the cutting unit 152.

Figure 5:
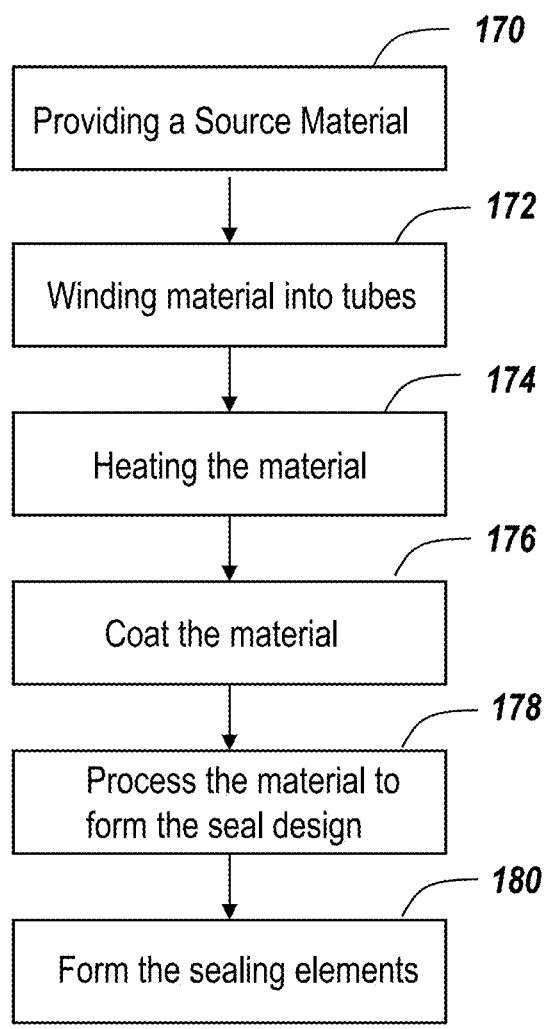
FIG. 5 is a schematic flow chart diagram illustrating the steps involved in forming the sealing elements of the present invention.

In operation, as shown in FIGS. 4-5, the sealing element formation system 140 can provide the source material, step 170, via the material source unit 142. The material is preferably an elastomer material that can be provided or supplied in any selected form, such as sheets. The elastomer source material is then wound into elongated structures or tubes, step 174, by the winding machine 144. The elastomer tubes are then heated to form a substantially homogeneous product for a selected period of time, step 174.

The heated source material tube can then be coated with a suitable coating material by the coating unit 148, step 176. The coating material can be any suitable material, such as a resin material, such that when the heated source material is coated, the coated material is sufficiently stiff for subsequent machining on any conventional chipping or lathing machine.

The outer resin layer allows the coated material to be secured in and to be processed by the turning or lathing machine 150. The turning machine 150 can be employed to machine or cut any type of contour into the generally rectangular elastomer source material. The turning is preferably done by machining, carving, cutting or chipping material away from the tube until the outer dimensions and contours (e.g., profile) of the tube relatively match or are complementary in shape with the specific dimensions of the channel or groove, step 178. For example, the coated material can be processed or machined along the outer surface so as to create the cross-sectional profile of the sealing elements 80, 82 and 88.

The illustrated formation system 140 can also include a cutting unit 152, which can be integrated into the turning machine 150 or can be a separate and distinct unit 152, that includes one or more cutting elements suitable for cutting the material. The cutting unit 152 can be employed to cut the turned material into the individual annular or ring-like sealing elements, step 180.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. A method of forming a sealing element for a mechanical seal, comprising the sequential steps of:
    winding a source of elastomer material into an elongated tubular shape,
    heating the elastomer material to form a homogenous elastomer material,
    coating the homogenous elastomer material with a resin material,
    placing the resin coated elastomer material into a turning machine so as to rotate the resin coated elastomer material,
    forming the outer profile and shape of the sealing element into the resin coated elastomer material by removing material therefrom to form a shaped resin coated elastomer material, and
    cutting the sealing elements from the shaped resin coated elastomer material.

2. The method of claim 1, wherein the elastomer material includes ethylene propylene (EP), ethylene propylene diene methylene (EPDM), fluoroelastomers including FKM and FPM as defined by the ASTM International standard D1418, perfluoroelastomers including FFKM, and tetrafluoroethylene-propylene rubber including FEPM.

3. The method of claim 2, wherein the elastomer material has a hardness between about 70 Shore A and about 90 Shore A.

4. The method of claim 1, wherein the method forming the sealing element is free of a step of coating an adhesive on the elastomer material.

5. A mechanical seal for mounting about a shaft, comprising
    a holder assembly having a main body having an inner surface and an opposed outer surface, and a first groove formed in the inner surface of the holder assembly and a second groove formed in the inner surface of the holder assembly and axially spaced apart from the first groove, such that the first and second grooves are formed at opposed ends of the main body,
    a rotary seal ring coupled to the holder assembly,
    a stationary seal ring disposed adjacent to the rotary seal ring,
    a first sealing element for seating within the first groove and having a shape that is substantially complementary to a shape of the first groove so as to fill substantially completely the first groove, and
    a second sealing element for seating within the second groove and having a shape that is substantially complementary to the shape of the second groove so as to fill substantially completely the second groove,
    wherein the main body of the holder assembly has one or more fastener-receiving apertures formed therein and extending between the inner surface and the outer surface and being sized and configured for seating a fastener.

6. The mechanical seal of claim 5, further comprising
    first and second cover grooves formed in the outer surface of holder assembly, wherein the first cover groove is formed on one side of the fastener-receiving aperture and the second cover groove is formed on the other side of the fastener-receiving aperture, wherein the first and second cover grooves are separate and distinct from each other and are axially spaced apart from each other, and wherein the fastener receiving apertures are disposed external to each of the first cover groove and the second cover groove, and
    a sealing cover element having a main body having a first leg portion, an opposed second leg portion, and an intermediate portion disposed between and coupled to the first and second leg portions,
    wherein the first leg portion of the sealing cover element is sized and configured for seating within the first groove, the second leg portion of the sealing cover element is sized and configured for seating within the second groove, and the intermediate portion of the sealing cover element covers the fastener-receiving aperture.

7. The mechanical seal of claim 6, wherein the first leg portion is sized and configured so as to fill substantially completely the first cover groove, and the second leg portion is sized and configured so as to fill substantially completely the second cover groove.

8. The mechanical seal of claim 7, wherein the intermediate portion of the sealing cover element has a top surface and an opposed bottom surface, and the first and second leg portions each have a top surface and an opposed bottom surface,
    wherein the top surface of the intermediate portion is radially and axially spaced from the top surface of the first and second leg portions, and the bottom surface of the intermediate portion is radially and axially spaced from the bottom surface of the first and second leg portions.

9. The mechanical seal of claim 8, wherein the bottom surface of the first and second leg portions is radially spaced from the bottom surface of the intermediate portion.

10. A mechanical seal for mounting about a shaft, comprising
    a holder assembly having a main body having an inner surface and an opposed outer surface, and a first groove formed in the inner surface of the holder assembly and a second groove formed in the inner surface of the holder assembly and axially spaced apart from the first groove, such that the first and second grooves are formed at opposed ends of the main body, a rotary seal ring coupled to the holder assembly, a stationary seal ring disposed adjacent to the rotary seal ring, a first sealing element for seating within the first groove and having a shape that is substantially complementary to a shape of the first groove so as to fill substantially completely the first groove, a second sealing element for seating within the second groove and having a shape that is substantially complementary to the shape of the second groove so as to fill substantially completely the second groove, first and second cover grooves formed in the outer surface of holder assembly, wherein the first and second cover grooves are separate and distinct from each other and are axially spaced apart from each other, and a sealing cover element having a main body having a first leg portion, an opposed second leg portion, and an intermediate portion disposed between and coupled to the first and second leg portions, wherein the first leg portion of the sealing cover element is sized and configured for seating within the first groove and the second leg portion of the sealing cover element is sized and configured for seating within the second groove.

11. The mechanical seal of claim 10, wherein the first leg portion is sized and configured so as to fill substantially completely the first cover groove, and the second leg portion is sized and configured so as to fill substantially completely the second cover groove.

12. The mechanical seal of claim 10, wherein the first cover groove is formed on one side of a fastener-receiving aperture and the second cover groove is formed an opposite side of the fastener-receiving aperture, and wherein the intermediate portion of the sealing cover element covers the fastener-receiving aperture.

13. The mechanical seal of claim 10, wherein the intermediate portion of the sealing cover element has a top surface and an opposed bottom surface, and the first and second leg portions each have a top surface and an opposed bottom surface, wherein the top surface of the intermediate portion is radially and axially spaced from the top surface of the first and second leg portions, and the bottom surface of the intermediate portion is radially and axially spaced from the bottom surface of the first and second leg portions.

14. The mechanical seal of claim 10, wherein a bottom surface of each of the first and second leg portions are radially spaced from a bottom surface of the intermediate portion.

* * * * *